(12) United States Patent
Satou et al.

(10) Patent No.: US 7,577,338 B2
(45) Date of Patent: Aug. 18, 2009

(54) DISC RECORDING AND/OR REPRODUCING APPARATUS HAVING A CASE WITH A PARTITION WALL FOR FORMING TWO CHAMBERS

(75) Inventors: Mayumi Satou, Kanagawa (JP); Hiroyuki Tsutsui, Kanagawa (JP); Hajime Ishimitsu, Kanagawa (JP)

(73) Assignee: Sony Corporation (JP)

( * ) Notice: Subject to any disclaimer, the term of this patent is extended or adjusted under 35 U.S.C. 154(b) by 554 days.

(21) Appl. No.: 10/901,280

(22) Filed: Jul. 28, 2004

(65) Prior Publication Data

US 2005/0084252 A1 Apr. 21, 2005

(30) Foreign Application Priority Data

Aug. 12, 2003 (JP) .......................... P2003-292505

(51) Int. Cl.
*H04N 5/00* (2006.01)
*H04N 5/225* (2006.01)

(52) U.S. Cl. ...................................... 386/117; 348/373

(58) Field of Classification Search ................ 386/117, 386/118, 38; 358/906, 909.1; 348/373–376; 720/652, 655, 695

See application file for complete search history.

(56) References Cited

U.S. PATENT DOCUMENTS

| | | | |
|---|---|---|---|
| 5,335,217 A | | 8/1994 | Kaneda et al. |
| 5,426,628 A | | 6/1995 | Ishii et al. |
| 5,737,304 A | * | 4/1998 | Soga et al. .................. 720/692 |
| 5,886,851 A | * | 3/1999 | Yamazaki et al. ........ 360/97.02 |
| 5,970,035 A | * | 10/1999 | Ohmori et al. ............. 369/53.2 |
| 6,002,657 A | * | 12/1999 | Furukawa et al. ........ 369/53.22 |
| 6,122,237 A | * | 9/2000 | Ohmori et al. ........... 369/53.19 |
| 6,241,531 B1 | * | 6/2001 | Roath et al. .................... 439/66 |
| 6,243,346 B1 | * | 6/2001 | Furukawa et al. ........... 720/652 |
| 6,304,528 B1 | * | 10/2001 | Kanda et al. ............. 369/44.28 |

(Continued)

FOREIGN PATENT DOCUMENTS

EP 0 851 422 7/1998

(Continued)

OTHER PUBLICATIONS

European Search Report, EP 04 25 4706.

(Continued)

*Primary Examiner*—Thai Tran
*Assistant Examiner*—Gelek Topgyal
(74) *Attorney, Agent, or Firm*—Lerner, David, Littenberg, Krumholz & Mentlik, LLP

(57) ABSTRACT

A partition wall composed of a conductor for partitioning the inside of a case into two portions in which approximately all of at least one face of the partition, wall is covered by an insulation plate. A table rotation device and an optical pickup device are disposed in a first chamber in the case partitioned by the partition wall and the insulation plate. A printed circuit board 4 disposed in a second chamber formed in the case. In this manner, a possibility of a phenomenon that the table rotation device or the optical pickup device is affected thermally based on the heat generated caused by the operation of electronic parts or the like mounted on the printed circuit board such that a malfunction or the like occurs will be avoided.

4 Claims, 12 Drawing Sheets

U.S. PATENT DOCUMENTS

| | | | |
|---|---|---|---|
| 6,341,104 B1 * | 1/2002 | Yamaguchi et al. | 369/44.15 |
| 6,501,030 B1 * | 12/2002 | Parizi et al. | 174/250 |
| 6,546,187 B1 * | 4/2003 | Miyazaki et al. | 386/52 |
| 6,636,687 B1 * | 10/2003 | Ando et al. | 386/55 |
| 6,741,802 B1 * | 5/2004 | Nakagawa et al. | 386/117 |
| 6,769,815 B2 * | 8/2004 | Imazu | 385/88 |
| 6,834,393 B2 * | 12/2004 | Akimaru et al. | 720/698 |
| 7,046,281 B1 * | 5/2006 | Kumagai et al. | 348/231.99 |
| 7,123,481 B2 * | 10/2006 | Gotou et al. | 361/704 |
| 7,127,150 B2 * | 10/2006 | Maeda | 386/52 |
| 7,180,546 B2 * | 2/2007 | Kobayashi | 348/374 |
| 7,190,546 B2 * | 3/2007 | Ehrlich | 360/75 |
| 7,283,730 B1 * | 10/2007 | Inoue et al. | 386/117 |
| 2001/0022627 A1 * | 9/2001 | Bernhardt | 348/373 |
| 2002/0191951 A1 * | 12/2002 | Sodeyama et al. | 386/46 |
| 2003/0058352 A1 * | 3/2003 | Nishijima et al. | 348/231.1 |
| 2003/0058772 A1 | 3/2003 | Takagi et al. | |
| 2004/0126099 A1 * | 7/2004 | Mori et al. | 386/117 |
| 2005/0053352 A1 * | 3/2005 | McKain et al. | 386/46 |

FOREIGN PATENT DOCUMENTS

| | | | |
|---|---|---|---|
| EP | 1 009 164 | | 6/2000 |
| JP | 62-266986 | * | 11/1987 |
| JP | 03001411 | | 1/1991 |
| JP | 03001765 | | 1/1991 |
| JP | 03001767 | | 1/1991 |
| JP | 03001768 | | 1/1991 |
| JP | 04-032300 | | 2/1992 |
| JP | 4-115395 U | | 10/1992 |
| JP | 05-114283 A | | 5/1993 |
| JP | 10-188551 A | | 7/1998 |
| JP | 10188551 A | * | 7/1998 |
| JP | 10-308050 A | | 11/1998 |
| JP | 2001-338460 A | | 12/2001 |
| JP | 2001338460 A | * | 12/2001 |
| JP | 2003-085964 A | | 3/2003 |
| JP | 2003-151255 A | | 5/2003 |
| JP | 2005-063559 A | | 3/2005 |

OTHER PUBLICATIONS

European Search Report, EP 04 25 4706, Issued on Apr. 25, 2008.

\* cited by examiner

DISC RECORDING AND/OR REPRODUCING APPARATUS HAVING A CASE WITH A PARTITION WALL FOR FORMING TWO CHAMBERS

BACKGROUND OF THE INVENTION

1. Field of the Invention

The present invention relates to a disc recording and/or reproducing apparatus in which an information signal of a record and/or a reproduction is made possible with respect to a disc shaped recording medium and more particularly relates to a disc recording and/or reproducing apparatus suitable for being used in an image pickup device which uses a disc shaped recording medium as an information recording medium.

2. Description of the Related Art

There has been known, for example, an apparatus described in a patent reference 1 as a conventional disc recording and/or reproducing apparatus which uses a disc shaped recording medium as a recording medium. In the patent reference 1 which was applied for a patent previously by the present patent applicant, there is described about electronic equipment of a DVD. (Digital Versatile Disc) player or the like and particularly about an insulator structure.

In electronic equipment having a structure in which an insulator made of an elastic body is mounted between an exterior body and a driving mechanism portion disposed in the exterior body and a driving mechanism portion is supported elastically by the exterior body through the insulator, the electronic equipment described in the patent reference 1 has a feature that the insulator comprises a vibration absorbing portion for absorbing a vibration by its elasticity when a vibration is added in a predetermined direction and a stopper portion for restricting a displacement by touching the exterior body side when a vibration beyond a range of a vibration absorption by means of the vibration absorbing portion is added as one body configuration.

According to the electronic equipment having such a constitution, it becomes possible to reduce the number of parts because it becomes unnecessary to compose the stopper portion by additional parts as in a conventional case so that cost saving and a further miniaturization and a thinner configuration of the equipment can be expected.

However, in case of such electronic equipment, it was constitution such that a circuit board formed as a discoid shape is made also to play a role of a chassis, the circuit board is equipped with a table rotation device and the device assembled body is contained in a space surrounded by an upper cabinet and a lower cabinet. Further, there are mounted a lot of electronic parts on the circuit board such as an LSI or an IC constituting a control circuit for drive-controlling an optical pickup device mounted on a table rotation device or on the table rotation device, a capacitor, a resistor or others. Therefore, there was a problem that heat generation is produced based on a fact that these electronic parts are driven and the table rotation device and the optical pickup device are affected thermally by the heat generation.

For example, when the table rotation device becomes a predetermined high temperature or more caused by the heat radiation of electronic parts, a problem that a malfunction might be produced in the electronic parts, a rotation efficiency deteriorates caused by a fact that the rotation of the spindle motor becomes unstable or the like is to occur.

[Cited Patent Reference 1] Japanese laid-open patent No. 2003-151255

SUMMARY OF THE INVENTION

The problem to be solved in the present invention lies in that a table rotation device or an optical pickup device is affected thermally based on a heat generation which occurs caused by an operation of an electronic part mounted on a printed circuit board or the like such that there is a possibility that a malfunction or the like is produced.

The invention according to claim 1 of the present application relates to a disc recording and/or reproducing apparatus which comprises a table rotation device for rotationally-driving a disc shaped recording medium mounted detachably; an optical pickup device for carrying out a record and/or a reproduction of an information signal with respect to the disc shaped recording medium driven rotationally by the table rotation device; a printed circuit board provided with a control circuit for drive-controlling the table rotation device and the pickup device; and an exterior packaging case in which the table rotation device, the pickup device and printed circuit board are contained, wherein the most specific feature thereof lies in that a partition wall composed of a conductor which partitions the inside of the exterior packaging case into two portions is provided, at least approximately the whole of one face of the partition wall is covered by a thermal insulation member, at the same time the table rotation device and the pickup device are disposed in one chamber in the exterior packaging case partitioned by the partition wall and the printed circuit board is disposed in the other chamber such that it has a constitution that heat of the printed circuit board side is not transmitted to the table rotation device side easily.

The invention according to claim 2 of the present application relates to a disc recording and/or reproducing apparatus, wherein the table rotation device is supported by a mechanical chassis and the mechanical chassis is supported by the partition wall elastically through an insulator composed of an elastic body.

The invention according to claim 3 of the present application relates to a disc recording and/or reproducing apparatus, wherein a grounding member which is made deformable in three directions of lengthwise, crosswise and in height connects between the mechanical chassis composed of a conductor and the partition wall.

The invention according to claim 4 of the present application relates to a disc recording and/or reproducing apparatus which comprises a solid-state imaging device from which a picture image corresponding to a photogenic subject is obtained by means of light inputted through a lens system, wherein the apparatus is an image pickup device in which the picture image obtained in the solid-state imaging device is made to be recordable on the disc shaped recording medium.

The invention according to claim 2 of the present application relates to a disc recording and/or reproducing apparatus which comprises a display device which can display the picture image obtained by the solid-state imaging device, wherein the picture image supplied from the solid-state imaging device and the picture image read out from the disc shaped recording medium can be displayed simultaneously on the display device by selectively or by being divided.

According to the invention described in claim 1 of the present application, it is possible to protect or suppress heat conduction by using a partition wall blocking between two chambers and to make it difficult for heat generated by the operation of electronic parts mounted on a printed circuit board to be transmitted to a table rotation device side, because it is constituted such that the inside of an exterior packaging case is partitioned by a partition wall into two portions, a table rotation device and a pickup device are disposed in one of the chambers and a printed circuit board is disposed in the other chamber. In this manner, it is possible to protect or suppress a phenomenon that the table rotation device is affected by the heat generated on the printed circuit board side and to protect or suppress a phenomenon that a malfunction occurs caused by a fact that the table rotation device becomes a high temperature more than necessary or the rotation efficiency becomes deteriorated.

According to the invention described in claim 2 of the present application, it is possible to protect or suppress a vibration on the side of the exterior packaging case to be transmitted to the mechanical chassis through the partition wall by holding the mechanical chassis such as being suspended in mid air apart from the partition wall, because it is constituted such that the mechanical chassis supporting the table rotation device through the insulator of an elastic body is supported by the partition wall elastically.

According to the invention described in claim 3 of the present application, it is possible to attempt ground strengthening by flowing a static charge or an operation current on the side of the table rotation device to the side of the partition wall certainly while minimizing a load for the elastic support by the insulator based on the connection structure, because it is constituted such that the mechanical chassis and the partition wall are connected by a grounding member which is deformable in three directions of lengthwise, crosswise and in height.

According to the invention described in claim 4 of the present application, it is possible to constitute the disc recording and/or reproducing apparatus as an image pickup device which can record a picture image obtained in the solid-state imaging device on a disc shaped recording medium by providing a solid-state imaging device from which a picture image corresponding to a photogenic subject is obtained by means of light inputted through a lens device. In this manner, it is difficult for heat generated by the operation of electronic parts mounted on a printed circuit board to be transmitted to the side of a table rotation device and the table rotation device is not affected by the heat generated on the side of the printed circuit board, and further it is possible to protect or suppress a phenomenon that a malfunction occurs caused by a fact that the table rotation device becomes a high temperature more than necessary or the rotation efficiency becomes deteriorated by making the heat influence smaller.

According to the invention described in claim 4 of the present application, it is possible to display the picture image supplied from the solid-state imaging device and the picture image read out from the disc shaped recording medium simultaneously on one picture screen selectively or by being divided, because it is constituted such that a display device is provided in the image pickup device.

DESCRIPTION OF THE PREFERRED EMBODIMENTS

A purpose for making it difficult for heat on the side of the printed circuit board in the exterior packaging case to be transmitted to the side of the table rotation device was realized in a simple structure by partitioning at least approximately the whole of one face into two chambers using a partition wall covered by a thermal insulation member, by disposing a printed circuit board in one of the chambers and at the same time by disposing a table rotation device or the like in the other of the chambers.

Figure 3:
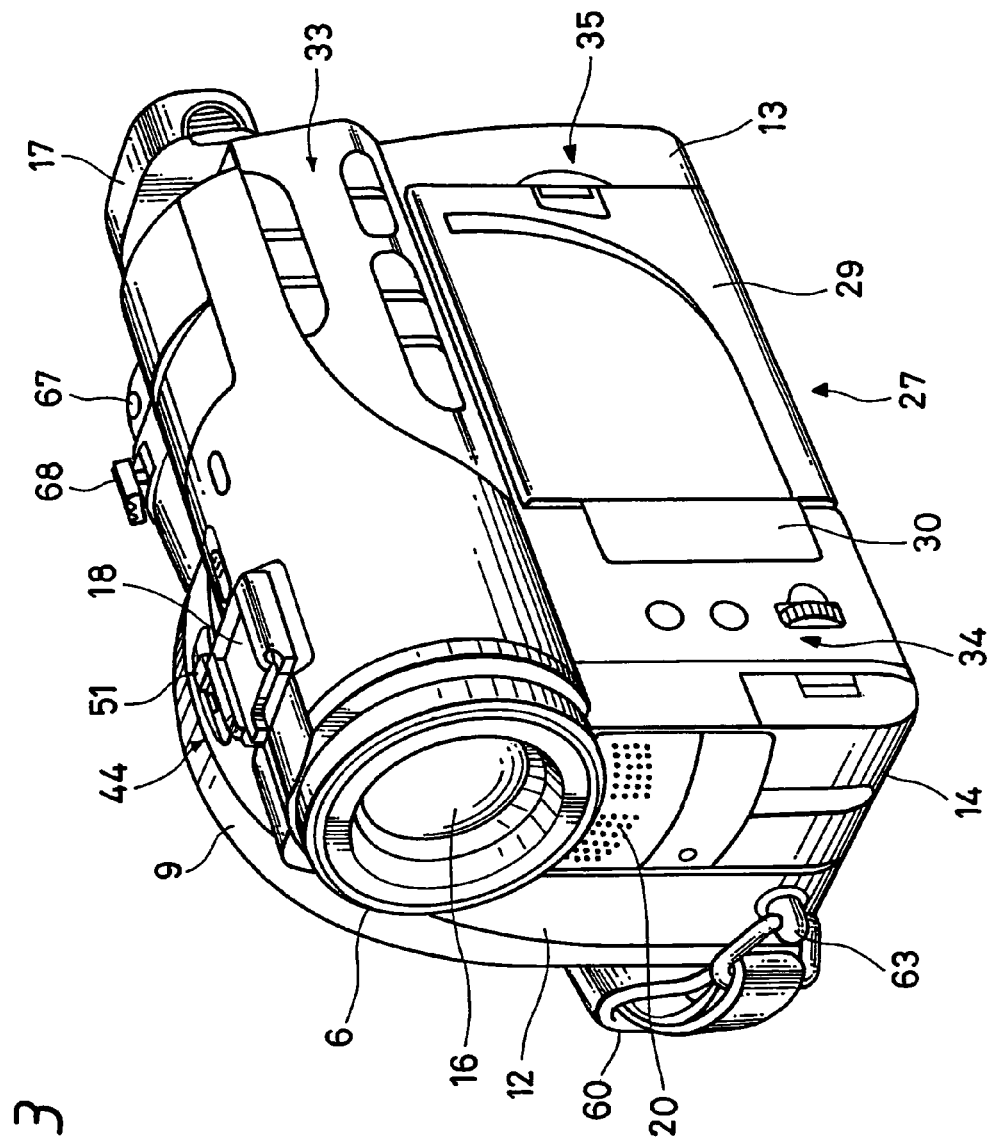
FIG. 3 is an oblique perspective diagram seeing a display device side of the disc type image pickup device shown in FIG. 1 from the front face side thereof.
Figure 4:
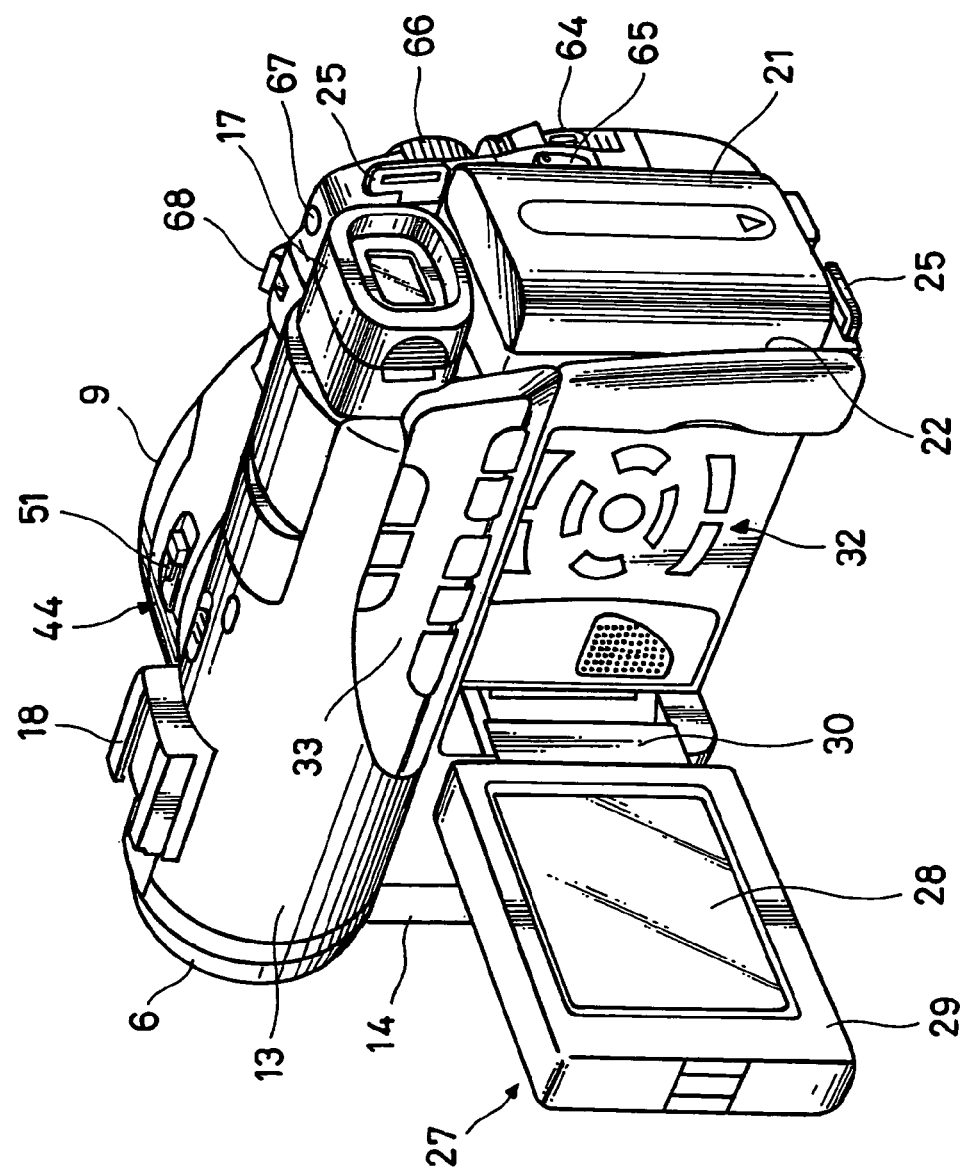
FIG. 4 an oblique perspective diagram seeing a display device of the disc type image pickup device shown in FIG. 1, when it is opened, from the back face side thereof.
Figure 5:
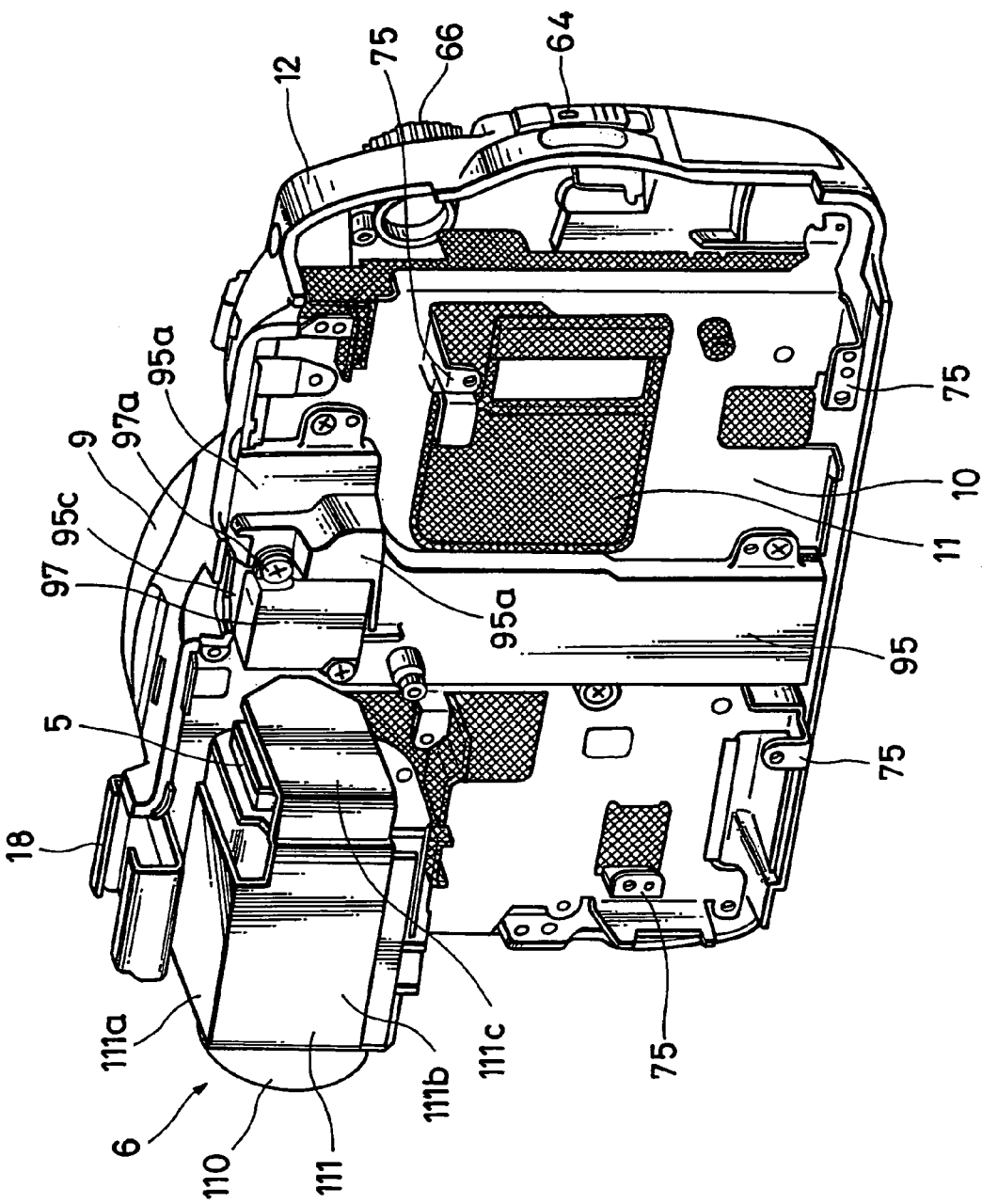
FIG. 5 is an oblique perspective diagram seen from the back face side and showing an internal partition wall or the like by removing a panel on a substrate side of the disc type image pickup device shown in FIG. 1.
Figure 6:
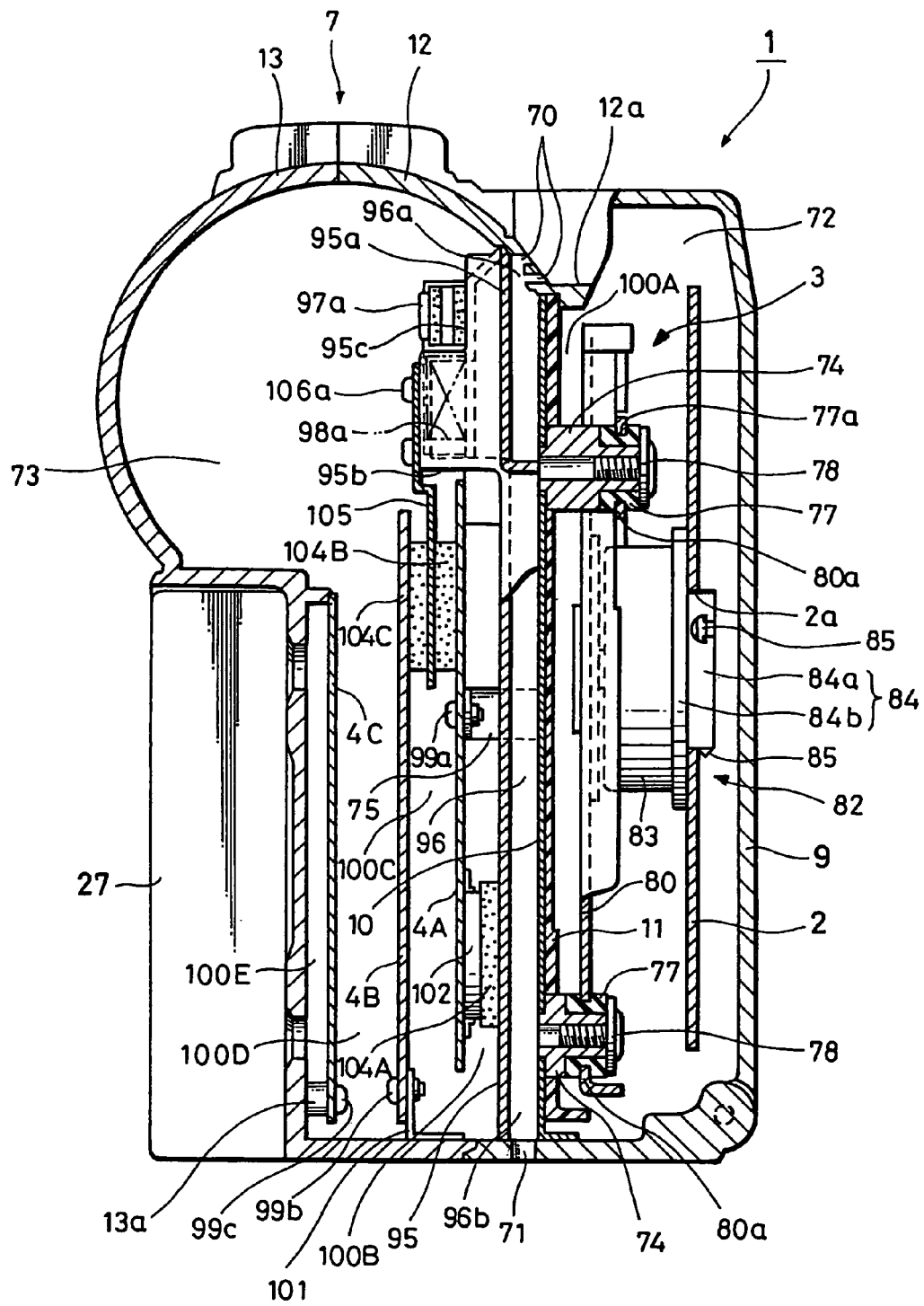
FIG. 6 is an explanatory diagram of the disc type image pickup device shown in FIG. 1 cross-sectioned at a midway portion of a back and forth direction.
Figure 10:
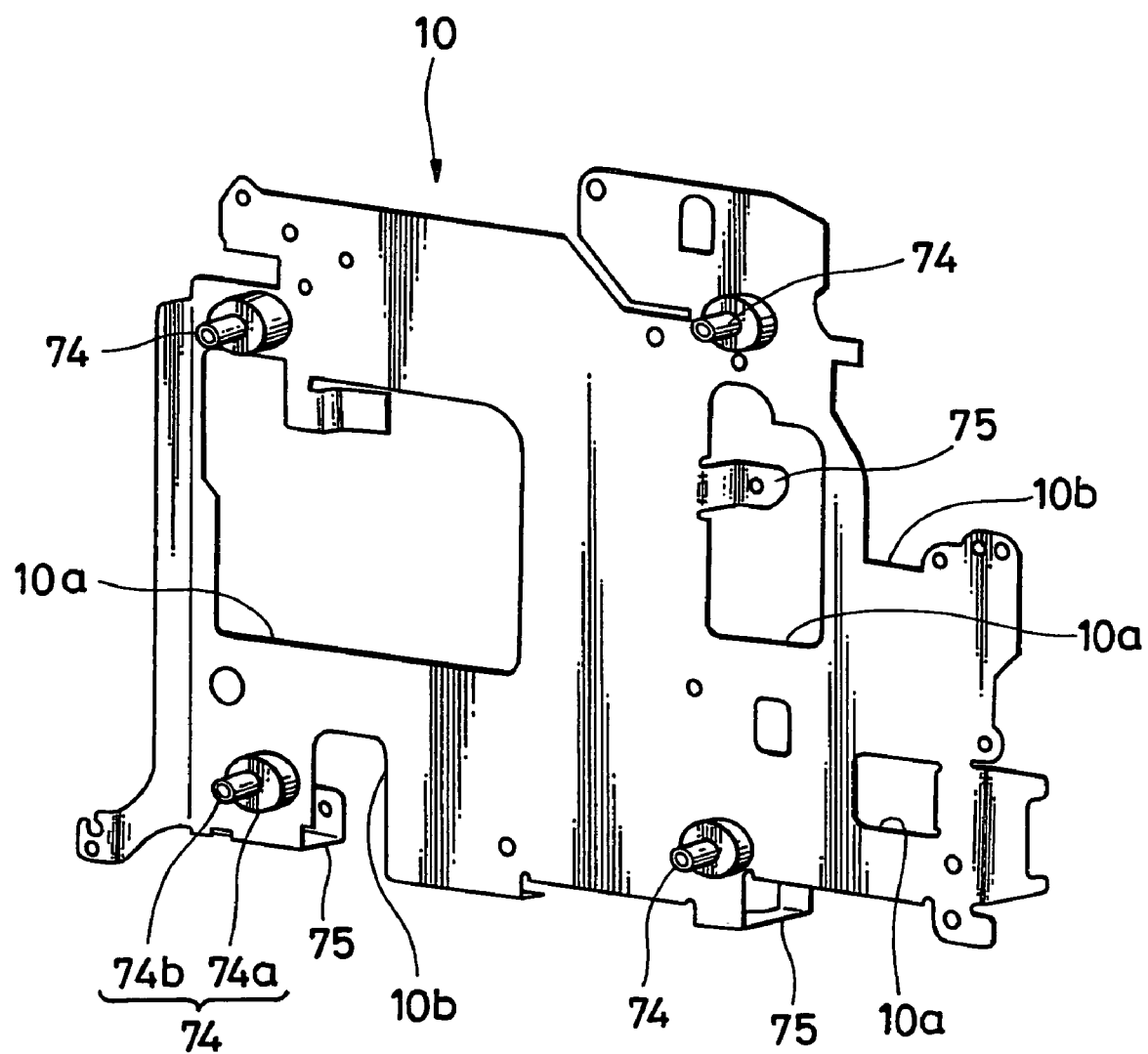
FIG. 10 is an oblique perspective diagram of a partition wall relating to the disc type image pickup device shown in FIG. 1.
Figure 11:
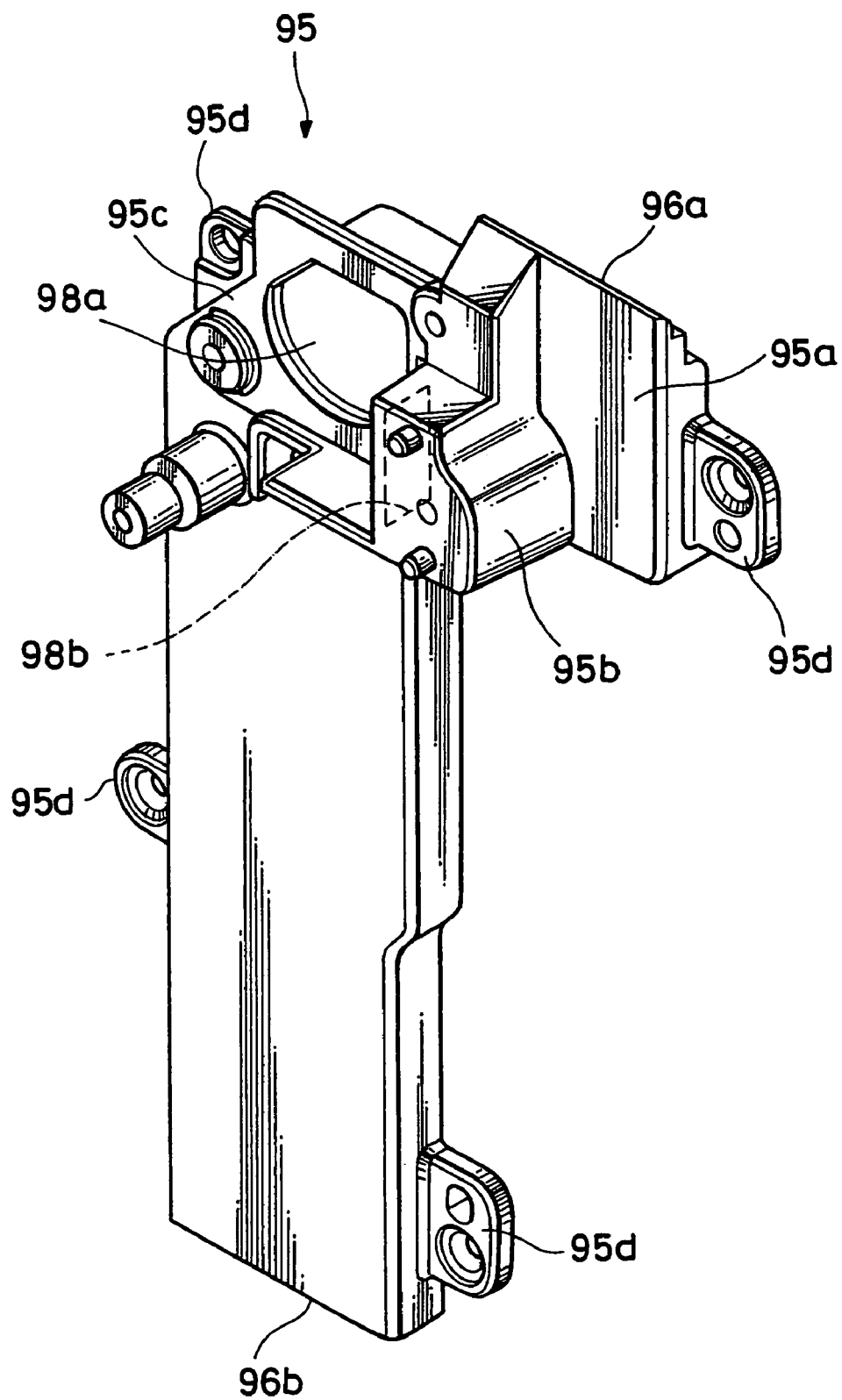
FIG. 11 is an oblique perspective diagram of a duct member relating to the disc type image pickup device shown in FIG. 1.
Figure 12:
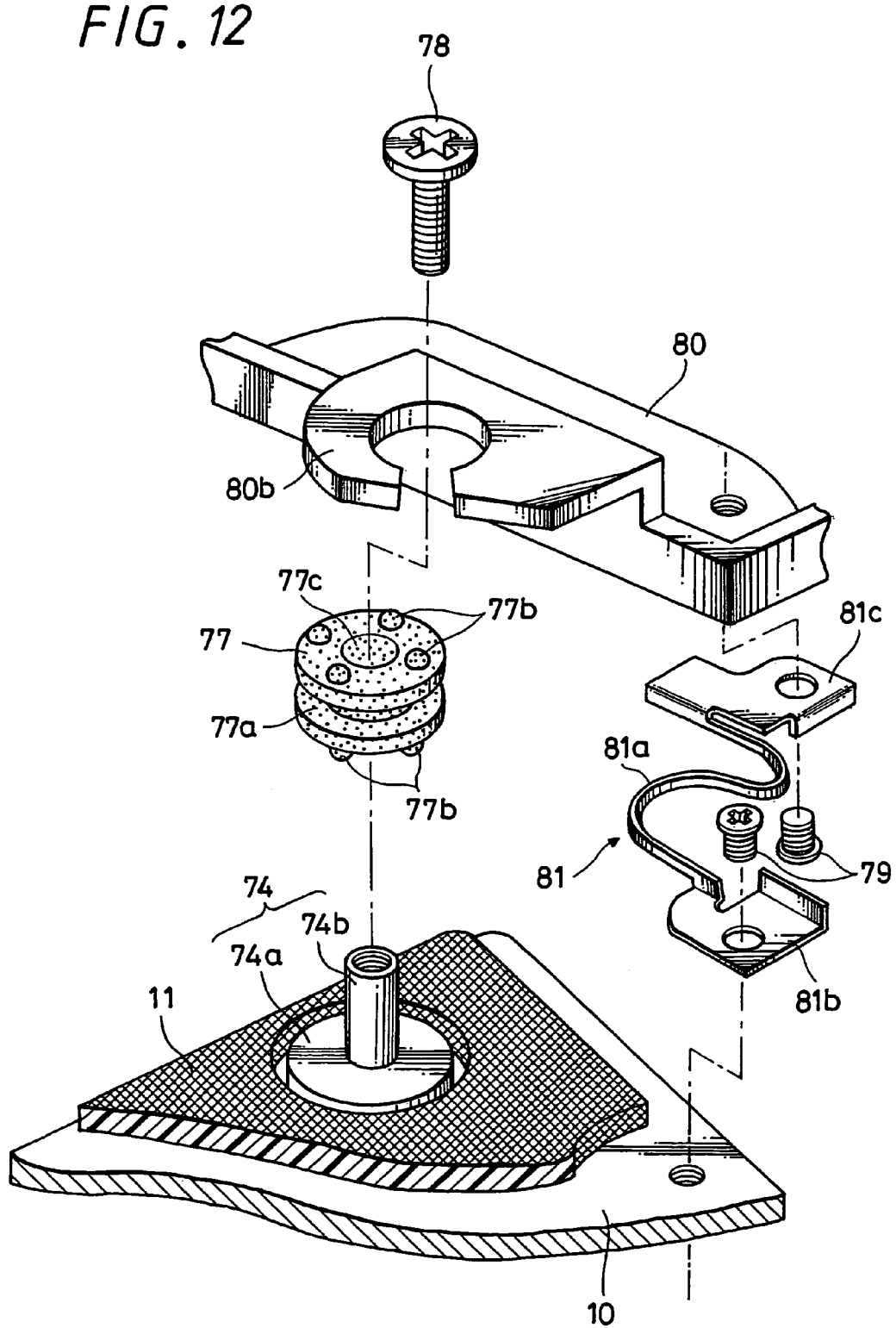
FIG. 12 is an oblique perspective diagram showing an insulator and a grounding spring relating to the disc type image pickup device shown in FIG. 1.

FIGS. 1 to 12 show exemplified embodiments according to the present invention. More specifically, FIGS. 1 to 4 are diagrams of an image pickup device showing one embodiment of a disc recording and/or reproducing apparatus according to the present invention, FIG. 5 is an oblique perspective diagram removing a panel on the substrate side of the image pickup device, FIG. 6 is a central longitudinal sectional view of the image pickup device, FIGS. 7 to 9 assembly diagrams of a partition wall of the image pickup device and a disc drive apparatus, FIG. 10 is an oblique perspective diagram of the partition wall, FIG. 11 is an oblique perspective diagram of a duct member, and FIG. 12 is an oblique perspective diagram showing an insulator and a grounding member.

An image pickup device 1 shown in FIG. 1 or the like shows one embodiment of a disc recording and/or reproducing apparatus, wherein a DVD is used as one specific example of a disc shaped recording medium which is an information recording medium, and it is made possible to record an optical picture image on the DVD by converting to an electrical signal in a CCD (solid-state imaging device), to display it on a display device such as an LCD monitor or the like (hereinafter, named as "disc type image pickup device"). However, the disc shaped recording medium used in the present invention is not restricted to DVD and it is needless to say that a recordable optical disc such as a CD-ROM or others can be used and it is possible to apply a disc shaped recording medium of other recording system such as, for example, a magneto-optical disc, a magnetic disc or the like.

The disc type image pickup device 1 is constituted as shown in FIGS. 1 to 6 such that it comprises a disc drive apparatus 3 for carrying out recording (writing in) and reproducing (reading out) an information signal by rotationally-driving a DVD 2 mounted detachably; a printed circuit board 4 (4A, 4B and 4C) provided with a control circuit for carrying out a drive control or the like of the disc drive apparatus 3; a lens device 6 for taking in an image of a photogenic subject as a light and for guiding it to a CCD 5; an exterior packaging case 7 in which these of the disc drive apparatus 3 and the like are contained; a disc lid 9 mounted on the exterior packaging case 7 freely rotatably for being able to cover a disc containing portion 8 so as to be able to open and close it; a partition wall 10 for partitioning the inside of the exterior packaging case 7 into two chambers; and an insulation plate 11 or the like for covering approximately the whole of one face of the partition wall 10.

The exterior packaging case 7 is composed of a disc side panel 12 and a panel 13 on the substrate side which are combined such as sandwiching the disc drive apparatus 3 or the like from both sides and a front panel 14 and a rear panel 15 which are disposed back and forth of a light axis direction of the lens device 6 and are combined with both of the panels 12 and the 13 where a hollow housing is constituted by these panels. The lens device 6 is fixed at an upper portion of the exterior packaging case 7 and an objective lens 16 thereof is exposed on the front face by passing through an upper portion of the front panel 14 forward. In the inside of the exterior packaging case 7, the CCD 5 is disposed backward with respect to the lens device 6 and a viewfinder 17 is disposed backward with respect to the CCD 5.

The viewfinder 17 is exposed at an upper portion of the exterior packaging case 7 and constituted such that the back side thereof is rotatable in an up and down direction by making the front side thereof as a rotational center. In this manner, it is made to be possible for the viewfinder 17 to be angle-adjusted to an arbitrary angle in a predetermined range of angle from a horizontal condition which is in parallel with the light axis of the lens device 6 until an upward condition where the back side is uplifted upward. Further, an accessories shoe 18 to which a video light, a microphone for being attached externally or the like is to be mounted detachably on an upper portion of the exterior packaging case 7 and on the front side of the viewfinder 17. Then, a microphone 20 of a stereo system is built-in on the downside of the lens device 6 of the front panel 14.

Figure 2:
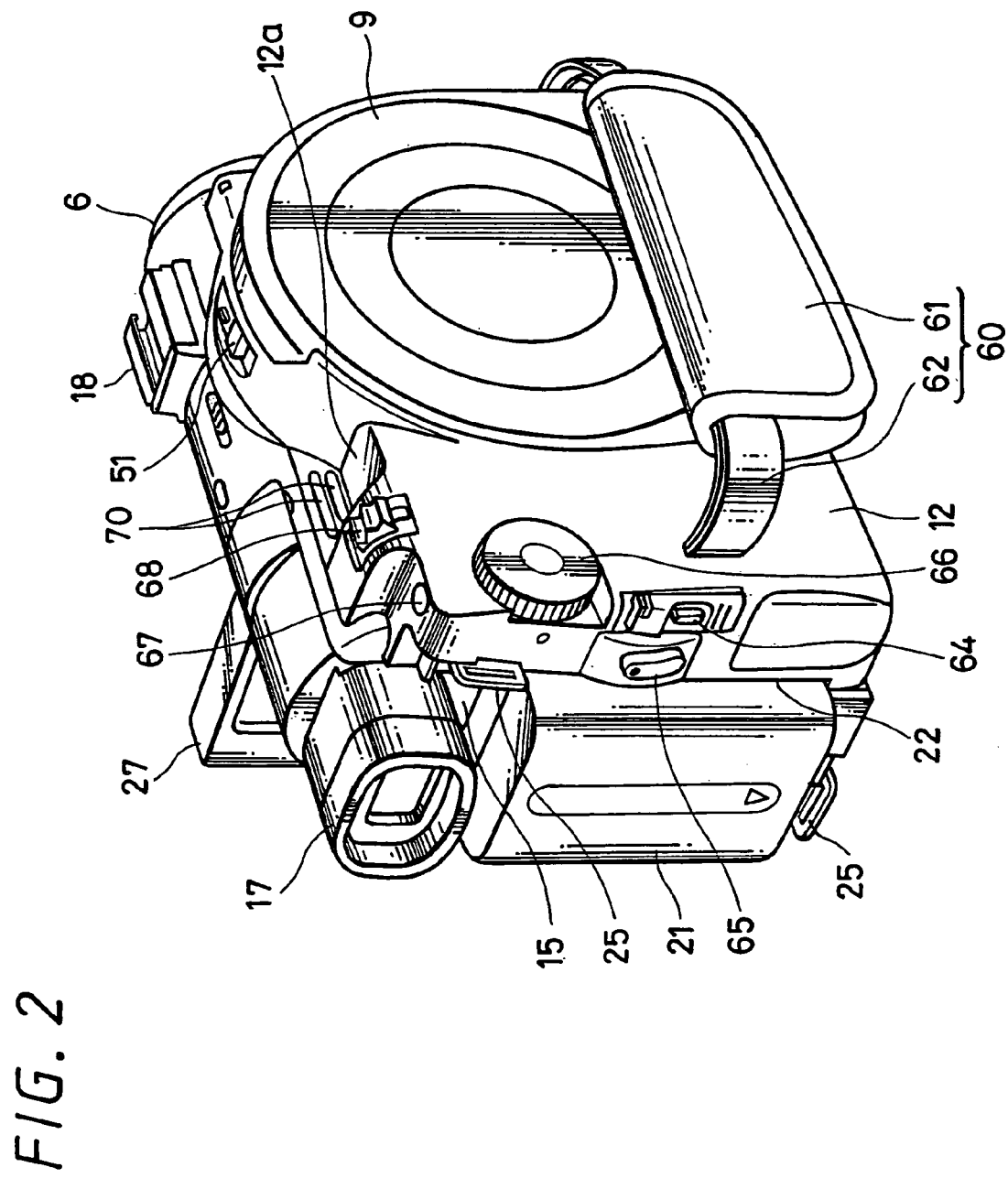
FIG. 2 is an oblique perspective diagram seeing a disc lid side of the disc type image pickup device shown in FIG. 1 from the back face side thereof.

As shown in FIG. 2 and FIG. 4, a battery attaching portion 22 to which a power supply battery 21 is to be mounted detachable is provided approximately at the center portion of the rear panel 15 of the exterior packaging case 7. The battery attaching portion 22 is opened on the upper face and the back face of the exterior packaging case 7 and the power supply battery 21 is made possible to be inserted and taken out from the rear side and obliquely upward side. Further, the rear panel 15 is provided with two mounting brackets 25 for a suspensory strap. One mounting bracket 25 from the two mounting brackets 25 is disposed at an upper portion on the right side and the other mounting bracket 25 is disposed at the bottom portion on the left side.

As shown in FIG. 3 and FIG. 4, a display device 27 is mounted at the panel 13 on the substrate side of the exterior packaging case 7 such as posture changeably. The display device 27 is composed of a tabular LCD monitor 28, a panel case 29 containing the LCD monitor 28 and a panel supporting mechanism 30 for supporting the panel case 29 such as posture changeably with respect to the exterior packaging case 7.

The panel supporting mechanism 30 comprises a horizontal rotation function which enables a rotation of the panel case 29 by approximately 90 degree in a horizontal direction by making the vertical axis as a rotational center and a back and forth rotation function which enables a rotation of the panel case 29 by approximately 180 degree in a back and forth direction by making the horizontal axis as a rotational center. In this manner, the display device 27 can selectively take a contained condition shown in FIG. 3, a condition in which the panel case 29 shown in FIG. 4 is rotated by 90 degree and the LCD monitor 28 is faced backward, and a condition in which the panel case 29 shown in FIG. 4 is rotated by 180 degree and the LCD monitor 28 is faced forward.

Further, the panel 13 on the substrate side is provided with an inner operation unit 32 composed of a lot of operation buttons covered as freely opened and closed by the panel case 29, an outside face operation unit 33 composed of a lot of operation buttons disposed on the upper side of the panel case 29, and an outside front operation unit 34 composed of a plurality of operation buttons or a operation dial disposed on the forward side of the panel case 29. The reference numeral 35 shown in FIG. 3 or the like designates a panel lock mechanism for locking the panel case 29 on a closed condition.

Figure 1:
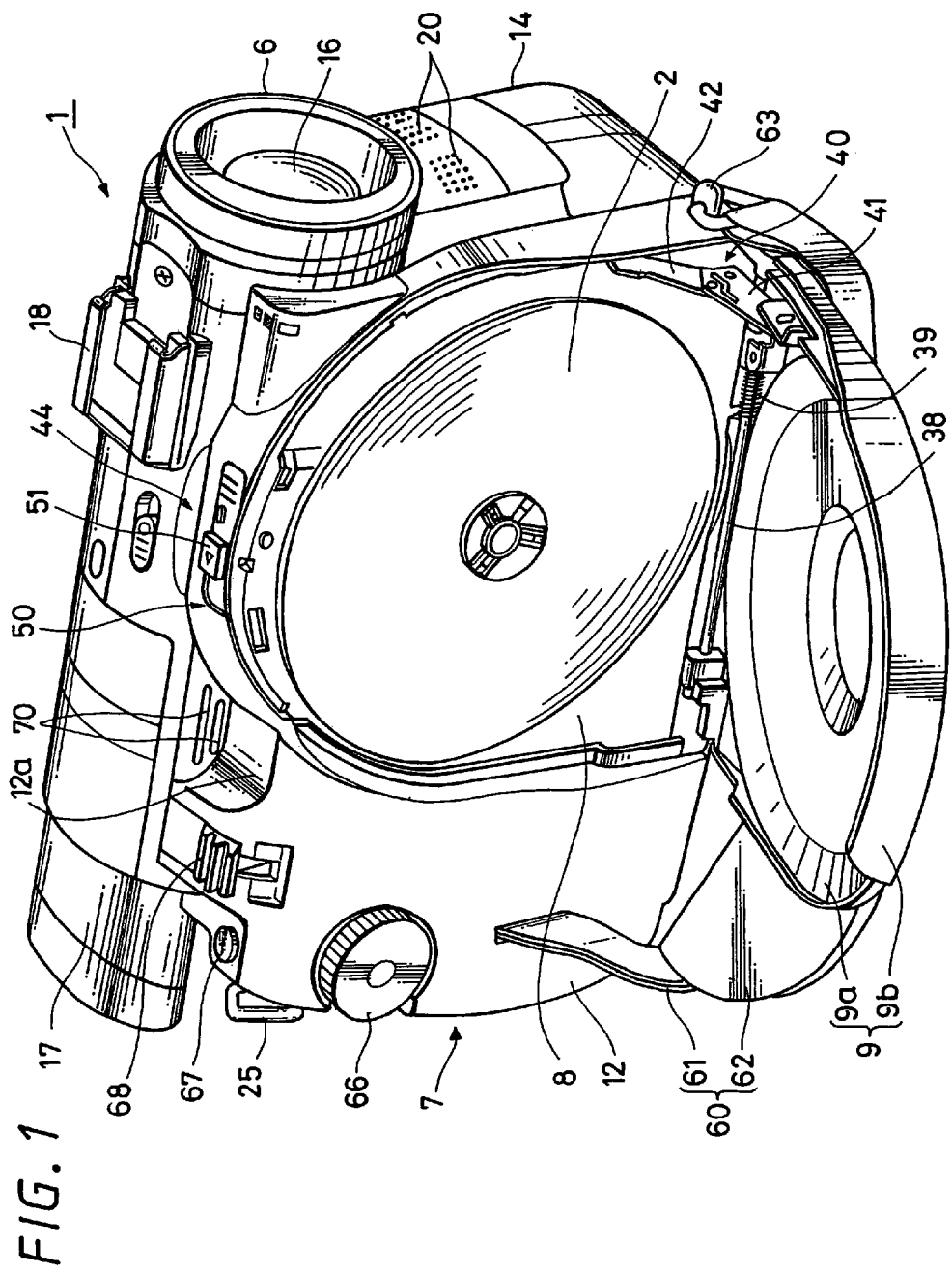
FIG. 1 shows a disc type image pickup device relating to one embodiment of a disc recording and/or reproducing apparatus according to the present invention where an oblique perspective diagram is shown on a condition that a disc lid is opened.

As shown in FIG. 1, the disc side panel 12 of the exterior packaging case 7 is provided with a disc containing chamber 8 composed of an opening portion for exposing a part of the disc drive apparatus 3. Approximately at the center portion of this disc containing chamber 8, a table rotation device of the disc drive apparatus 3 is disposed and the disc drive apparatus 3 is supported by the exterior packaging case 7 on that condition. This disc containing chamber 8 is covered by the disc lid 9 such that it can be opened and closed.

The disc lid 9 is made by a shape matching the shape of the disc containing chamber 8 and comprises a flat portion 9a covering the flat side of the disc containing chamber 8 and a side face portion 9b covering a side face notch portion of the disc containing chamber 8 continuously with a part of that flat portion 9a. Further, both side portions at the bottom of the disc lid 9 are provided with a pair of bearing portions 9c, 9c and a support axis 38 is inserted into these bearing portions 9c, 9c freely rotatably. Both edges of the support axis 38 are protruded outwardly from the respective bearing portions 9c, 9c and those protrusion edges are fixed to the disc side panel 12. In this manner, the disc lid 9 is supported by the disc side panel 12 through the support axis 38 freely rotatably.

Also, the support axis 38 is mounted with a twisted spring 39 a spring piece of one terminal of the twisted spring 39 is latched to the disc lid 9 and a spring piece of the other terminal is latched to the disc side panel 12. In this manner, the disc lid 9 is always biased by the spring force of the twisted spring 39 to the direction for opening the disc containing chamber 8. Further, a link mechanism 40 for limiting the opening amount of the disc lid 9 is hung between the disc lid 9 and the disc side panel 12. The link mechanism 40 is composed of a lid side link 41 supported by the disc lid 9 freely rotatably and a panel side link 42 supported by the disc side panel 12 freely rotatably, and front edge portions of both the links 41 and 42 are interconnected each other freely rotatably.

It is constituted by means of a lid lock device 44 disposed at the most distant portion from the support axis 38 such that the disc lid 9 can be locked on a condition that the disc containing chamber 8 is closed. The lid lock device 44 is constituted such that it is provided with a lock member that is not shown in the drawings and is fixed to the disc lid 9 and an operation member 51 and slide member or the like mounted slidably on the disc side panel 12. While the lock member is provided with a lock claw, the slide member is provided with a claw stopper which can be engaged with the lock claw. The claw stopper of the slide member is disposed on a moving locus of the lock claw by means of the spring force of the spring member.

In this manner, the lock claw to be engaged with the claw stopper retreats the slide member against the spring force of the spring member by pressing the disc lid 9 to the side of the disc side panel 12. Consequently, the claw stopper climbs over the lock claw and the claw stopper and the lock claw are engaged each other. In this manner, the disc containing chamber 8 is closed by the disc lid 9 and the disc lid 9 is locked to the disc side panel 12. The release of this lock can be carried out by slide-operating the operation member 51 to a lock release direction against the spring force of the spring member.

Also, the disc side panel 12 is mounted with a hand strap 60 such as enclosing the disc lid 9. The hand strap 60 is for protecting a miss-drop or the like of the disc type image pickup device 1 by supporting a user's hand portion which grips the disc lid 9 portion to be used as a grip portion of the exterior packaging case 7.

The hand strap 60 is composed of a supporting belt 61 whose both edges are fixed to the disc side panel 12 and a protection pad 62 which is mounted on the supporting belt 61 and is contacted with a back portion of a user's hand. One terminal of the supporting belt 61 is fixed to a mounting bracket 63 which is fixed at the front side and the bottom portion of the disc side panel 12 and the other terminal thereof is inserted into an inner side from a through hole provided at the back side midway portion of the disc side panel 12 and is fixed to a mounting bracket provided in the inside.

As shown in FIG. 2 or the like, a power supply switch 64, a record button 65 and a mode change-over dial 66 is disposed on the back side midway portion of the disc side panel 12. Then, a shutter button 67 and a zooming lever 68 are disposed on the back side and at the upper portion of the disc side panel 12. A concave portion 12*a* is set between the zooming lever 68 of the disc side panel 12 and the operation member 51 and an exhaust opening 70 which is opened to the side of the concave portion 12*a* is provided. The exhaust opening 70 is to be one of openings of the duct described later on. An inlet 71 which forms the other opening of the duct is provided at the bottom portion of the disc side panel 12 corresponding to that exhaust opening 70 (see FIG. 6).

It is suitable for the material of the exterior packaging case 7 having such a constitution to use, for example, ABS (acrylonitrile-butadiene-styrene resin), but it is needless to say that other engineering plastics can be applied and it is also possible to use a metal of an aluminum alloy or the like other than synthetic resins.

As shown in FIG. 5 and FIG. 6, the inside of above-mentioned exterior packaging case 7 is partitioned in the right and left direction (direction crossing the light axis of the lens device 6) by the partition wall 10 and there are provided a first chamber 72 on the side of the disc drive apparatus 3 and a second chamber 73 on the side of the printed circuit board 4. The partition wall 10 has a shape as shown in FIG. 10, is formed by a platy member and is clamp-fixed in the inside of the exterior packaging case 7 by a firmly fixing member such as a screw. The partition wall 10 plays a role of a frame and is provided with a plurality (four in the present embodiment) of supporting projections 74 for supporting the disc drive apparatus 3 on one face side, and a plurality of supporting pieces 75 are provided on the other face side for supporting the printed circuit board 4 or the like.

Further, the partition wall 10 is provided with opening portions 10*a* and notches 10*b* at a plurality of places for lightening the weight thereof. It is suitable for the material of the partition wall 10 to use, for example, stainless steel (SUS), but it is needless to say that steel, aluminum alloy and other metals can be applied and it is also possible to use engineering plastics other than metals. It should be noted that the major part of opening portions 10*a* and notches 10*b* is occluded by an insulation plate 11 formed by a thermal insulation member which will be explained next in order to take a structure where the first chamber 72 and the second chamber 73 are partitioned so as to make it difficult for heat to be transmitted.

More specifically, as shown by lattice patterns in FIG. 5 and FIGS. 7 to 9, the insulation plate 11 having a predetermined shape and structure is overlapped and constituted integrally such as covering approximately the whole of the partition wall 10 on one face of the partition wall 10. Further, the insulation plate 11 for electrically connecting the disc drive apparatus 3 disposed in the first chamber 72 and the printed circuit board 4 disposed in the second chamber 73 is provided with a communicating hole 76 through which a flexible printed board is inserted.

It is suitable for a means for fixing the insulation plate 11 to the partition wall 10 to use, for example, a method for screw-locking by using a plurality of fixing screws, but it is possible other than the above to use various firmly fixing means such as joining by adhesive materials, fixing by small-screw locking or the like. It is suitable for the material of the insulation plate 11 to use, for example, ABS which is light and has an excellent heat insulation characteristic, but it is needless to say that other engineering plastics can be applied and it is also possible to use ceramics, new ceramics or the like.

As shown in FIG. 6, the disc drive apparatus 3 is supported elastically on the face of the partition wall 10 overlapped with the insulation plate 11 through an insulator 77 composed of an elastic body. The insulator 77 is composed of a rubber-like elastic body formed cylindrically as shown in FIG. 12 and an annular groove 77*a* which is continuous in a circumferential direction is provided at a midway portion of its peripheral surface in an axial direction. Further, supporting projections 77*b* are provided on both faces of the insulator 77 in a tube axial direction for restricting the displacement of the insulator 77 and at the same time for absorbing the vibration in a tube axial direction.

A predetermined number (four in the present embodiment) of the insulators 77 are mounted to an insulator receiving portion 80*a* of a mechanical chassis 80 composed of a conductor in the disc drive apparatus 3 or in a notch hole provided in an insulator receiving piece 80*b* by fitting respective annular grooves 77*a*. Then, these four insulators 77 are fitted to the four support pin 74 which are provided in a protruding condition on one face of the partition wall 10 respectively. Each of the support pins 74 are composed of a support portion 74*a* having a nearly equal diameter as that of the insulator 77 and a projection portion 74*b* protruded at a center portion of the support portion 74*a* and is fixed to the partition wall 10 by a firmly fixing means such as calking or the like.

Four insulators 77 are mounted to the support pins 74 respectively by fitting the center holes 77*c* of the insulators 77 to the projection portions 74*b* of the support pins 74. Then, respective insulators 77 are protected from dropping out by mounting-screws 78 which are screwed together to the front edges of the projection portions 74*b* of the respective support pins 74. The mechanical chassis 80 supported elastically by the partition wall 10 through such insulators 77 is constituted by a frame-like member having an enough large strength.

Also, the partition wall 10 and the mechanical chassis 80 are connected electrically each other by a grounding member 81 having an excellent electric conductivity. The grounding member 81 is composed of a variable portion 81*a* which can be deformed (or flexible) in three directions of longitudinal and lateral directions (two directions orthogonal each other in planar directions) and a height direction (direction perpendicular to aforesaid planar), and fixed portions 81*b* and 81*c* which are continuous to both edges of the variable portion 81*a* respectively. The variable portion 81*a* of the grounding member 81 is formed in a condition that in case of, for example, making it in S-shaped, both edge portions thereof are movable almost without resistance along an S-shaped planar direction (longitudinal direction and lateral direction) and a height direction perpendicular thereto by making the wall thickness thereof extremely thin and at the same time by making the width thereof enough thin.

One fixed portion 81*b* continuous to the variable portion 81*a* is clamp-fixed to the partition wall 10 by a fixing screw 79. Also, the other fixed portion 81*c* continuous to the variable portion 81*a* is clamp-fixed to the mechanical chassis 80 by a fixing screw 79. The mechanical chassis 80 is connected to the partition wall 10 electrically conductively through the grounding member 81 and is grounded to a ground portion of the exterior packaging case 7. In particular, both of the fixed portions 81*b* and 81*c* of both the edges of the grounding member 81 are fixed by small-screw locking, so that it is possible to take a ground certainly. It is preferable for the material of the grounding member 81 to use, for example, a copper alloy, but it is also possible to use other metals.

Figure 7:
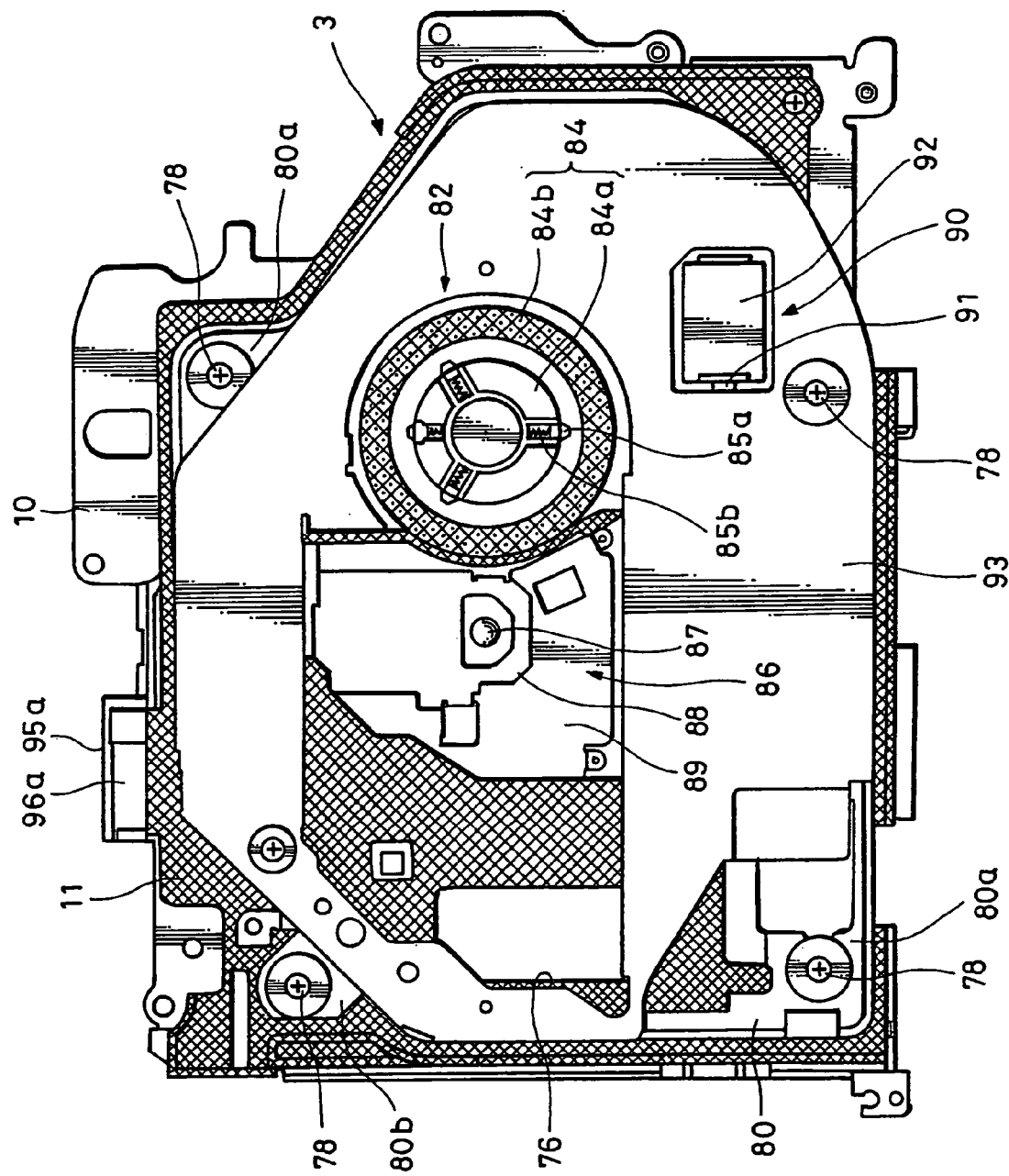
FIG. 7 is a plan view showing an assembled condition of a partition wall relating to the disc type image pickup device shown in FIG. 1 and a disc drive apparatus.
Figure 8:
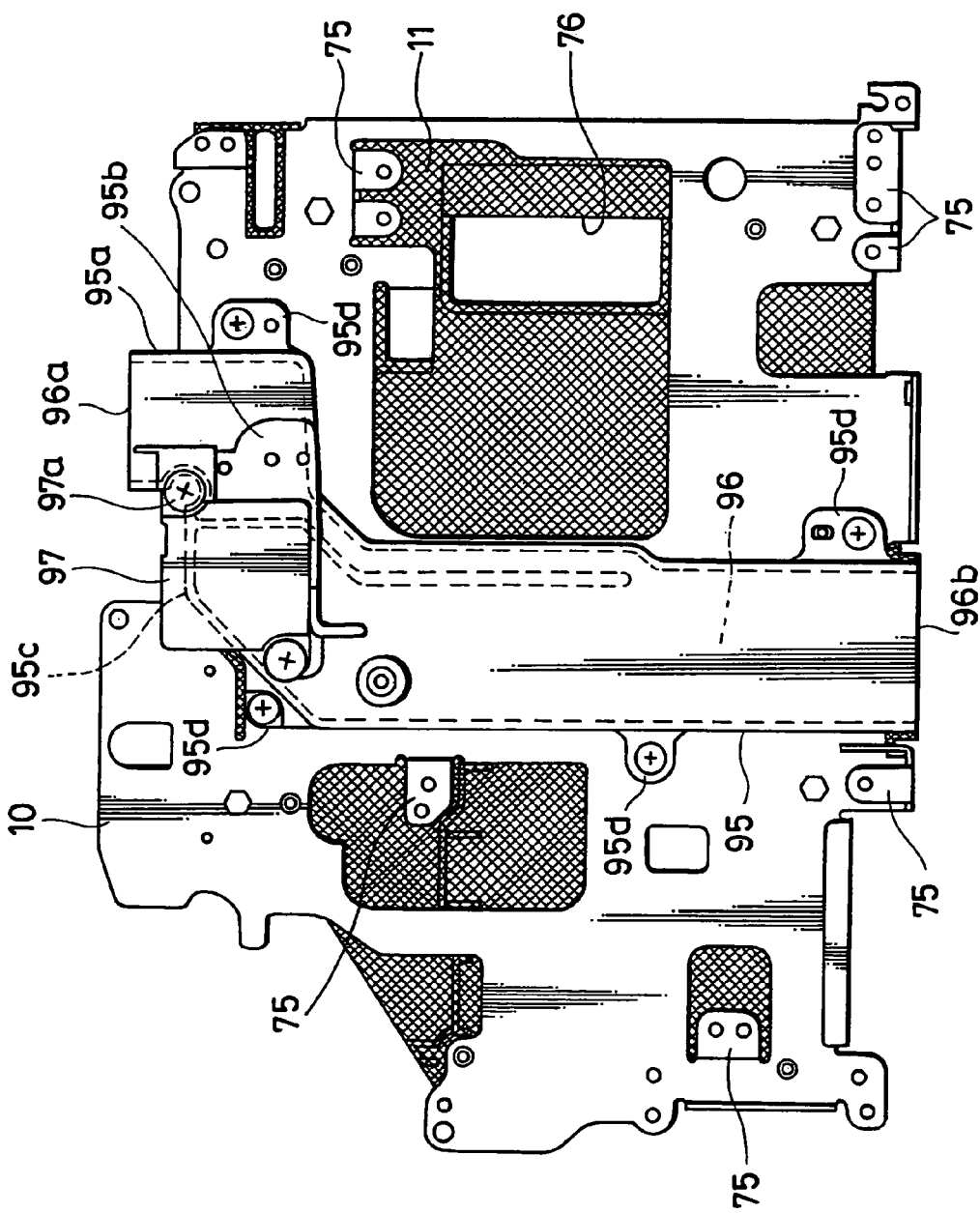
FIG. 8 is a bottom plan view showing an assembled condition of a partition wall relating to the disc type image pickup device shown in FIG. 1 and a disc drive apparatus.
Figure 9:
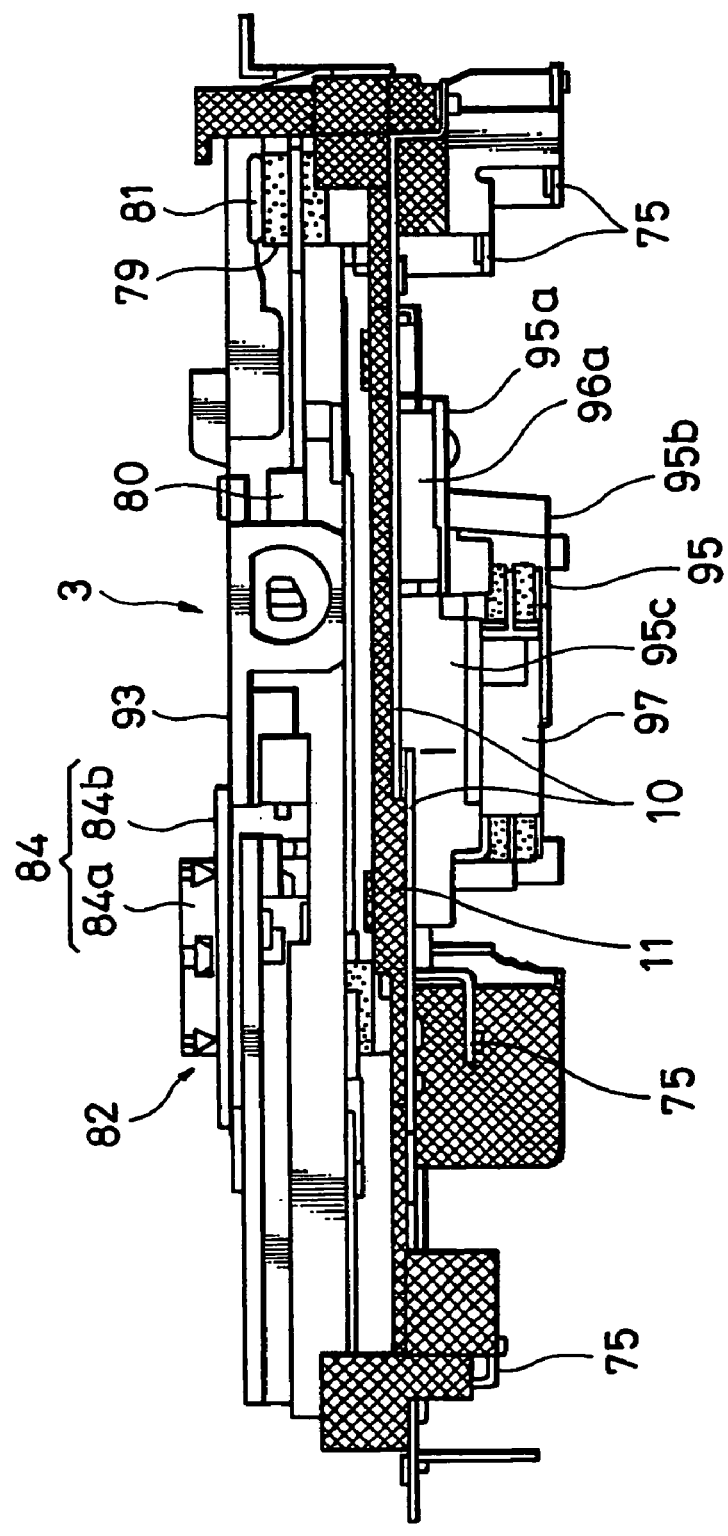
FIG. 9 is a side view showing an assembled condition of a partition wall relating to the disc type image pickup device shown in FIG. 1 and a disc drive apparatus.

Also, as shown in FIG. 6 and FIG. 7, the mechanical chassis 80 is equipped with a table rotation device 82 to which the DVD 2 is mounted detachably and an optical pickup device 86 showing one specific example of a pickup device. The table rotation device 82 is composed of a spindle motor 83 fixed to the mechanical chassis 80 and a turn table 84 fixed to a rotational portion of the spindle motor 83.

The turn table 84 is composed of a fitting portion 84*a* to which a center hole 2*a* of the DVD 2 is fitted and a placing portion 84*b* on which a marginal portion of the center hole 2*a* is placed. Further, the fitting portion 84*a* is provided with a plurality of engaging claws 85*a* which hold the DVD 2 by being engaged with the marginal portion of the center hole 2*a* of the DVD 2 in a circumferential direction with an equal interval. Respective engaging claws 85*a* are biased outward to a radial direction by a spring 85*b* and it becomes possible to carry out the mounting operation and the removing operation of the DVD 2 with respect to the fitting portion 84*a* by retreating the engaging claws 85*a* against the spring force of the spring 85*b*. It should be noted that the face of the placing portion 84*b* is set to be in parallel with the face of the mechanical chassis 80.

Also, the optical pickup device 86 is constituted so as to comprise a biaxial actuator 88 having a pickup lens 87 facing the information recording surface of the DVD 2 and a slide member 89 or the like equipped with the biaxial actuator 88. The slide member 89 is made movable guided by two guide axes which are not shown in the drawings. The two guide axes are made in parallel each other by sandwiching the spindle motor 83 and a pickup moving device 90 is provided in the vicinity of one of the guide axes.

As shown in FIG. 7, the pickup moving device 90 is composed of a feeding screw axis 91 engaged with a feeding nut which is not shown and is fixed to the slide member 89 and a feeding motor 92 having this feeding screw axis 91 as a rotation axis. The feeding screw axis 91 is set to be in parallel with a guide axis of the optical pickup device 86 and is supported freely rotatably by the mechanical chassis 80. In this manner, the optical pickup device 86 is moved selectively to a direction approaching the turn table 84 and to the direction away from the turn table 84 n response to the rotational direction of the feeding screw axis 91 by rotationally-driving the feeding motor 92.

The disc drive apparatus 3 is composed of afore said mechanical chassis 80, the table rotation device 82, the optical pickup device 86 and the pickup moving device 90. The upper face of the disc drive apparatus 3 is covered by a protective cover 93 for its major part excluding a predetermined region for the turn table 84 and the optical pickup device 86 and a portion of the feeding motor 92.

The disc drive apparatus 3 having such a constitution is positioned at a predetermined position in the first chamber 72 through the partition wall 10 which partitions the inside of the exterior packaging case 7 into right and left directions by mounting the partition wall 10 at a predetermined position of the inside of the exterior packaging case 7 as shown in FIG. 5. At this time, the turn table 84 and its peripheral portion of the disc drive apparatus 3 are faced in the disc containing chamber 8 of the disc side panel 12 and are faced to the disc lid 9. Then, as shown in FIG. 6, a thermal insulation gap 100A composed of air layer is set between the disc drive apparatus 3 and the partition wall 10 or the insulation plate 11, and it is made to be a structure such that it is difficult for the heat to be transmitted from the partition wall 10 to the disc drive apparatus 3.

A duct member 95 elongated in an up and down direction crossing the back and forth direction is fixed at a midway portion of the face in the back and forth direction on the opposite side of the insulation plate 11 of the partition wall 10 by means of a firmly fixing means such as a screw locking or the like. The duct member 95 is to set a path of fluid (duct) passing through in an up and down direction approximately at the center portion of the exterior packaging case 7 and a fluid path 96 is formed between it and the partition wall 10.

The duct member 95 is made to be a crank shaped biased in a back and forth direction as shown in FIG. 11 and a deviated portion 95*a*, an evaginated portion 95*b* and a seat portion 95*c* are provided at the upper edge thereof. A bottom opening portion 96*b* which is communicated to the inlet 71 provided on the bottom face of the disc side panel 12 is formed at the bottom of the duct member 95 and an upper edge opening portion 96*a* which is communicated to the exhaust opening 70 provided on the upper face of the disc side panel 12 is formed at the deviated portion 95*a*.

Though not shown in the drawings, a partition wall is provided at a portion connected to the deviated portion 95*a* of the duct member 95 rain water which may get into the inside of the fluid path 96 by way of its partition wall from the exhaust opening 70 to the upper edge opening portion 96*a* is to be guided to the side of the bottom opening portion 96*b*. As shown in FIG. 5 and FIG. 6, a fan 97 for streaming ambient air compulsorily to the fluid path 96 is clamp-fixed at the seat portion 95*c* of the duct member 95 by a firmly fixing means of a mounting screw 97*a* through an insulator composed of an elastic body. The seat portion 95*c* is provided with a first opening portion 98*a* opened exteriorly and also, the evaginated portion 95*b* neighboring to the deviated portion 95*a* is provided with a second opening portion 98*b* opened to the side of the seat portion 95*c*.

The first opening portion 98*a* of the duct member 95 is made to face the inlet of the fan 97 and at the same time the second opening portion 98*b* is made to face the discharge opening of the fan 97. In this manner, a negative pressure is operated at the bottom opening portion 96b of the fluid path 96 when the fan 97 is driven rotationally and cold air of the ambient air is introduced into the inside of the fluid path 96 by way of the bottom opening portion 96b from the inlet 71 opened on the bottom face of the exterior packaging case 7. Then, the air gets into the inside of the inlet of the fan 97 from the first opening portion 98a and that air is discharged to the upper edge opening portion 96a by way of the second opening portion 98b from the discharge opening of the fan 97. Further, the air discharged to the upper edge opening portion 96a is exhausted exteriorly from the exhaust opening 70 opened on the upper face of the exterior packaging case 7.

The duct member 95 having such a constitution is provided with a plurality of mounting pieces 95d to which mounting screws for fixing it to the partition wall 10 are to be inserted. It is suitable for the material of the duct member 95 to use, for example, an aluminum alloy or other metal which has an excellent thermal conductivity, but it is also possible to use an engineering plastic or the like having a thermal conductivity.

In this manner, since the fluid path 96 formed by the duct member 95 is provided approximately at the center portion of the exterior packaging case 7 so as to pass through in an up and down direction, it is possible to radiate the heat of the inside of the exterior packaging case 7 exteriorly by using the fluid path 96. Therefore, it is possible to inhibit the temperature of the spindle motor 83, the biaxial actuator 88 or the like of the disc drive apparatus 3 from becoming high more than necessary and in this manner, it is possible to prevent a rotational defect or malfunction of the spindle motor 83 or the like caused by the temperature increase from occurring. Furthermore, the fan 97 is disposed in the fluid path 96, so that the ambient air is circulated compulsorily in the fluid path 96 by driving this fan 97 such that the cooling efficiency of the internal devices can be made high.

On the other hand, since the exhaust opening 70 is opened on the upper face of the disc side panel 12, it happens, for example, that rain water gets into the inside of the fluid path 96 from the exhaust opening 70 in case of outdoor photographing or the like on rainy weather. Also in such a case, the rain water getting into the inside of the fluid path 96 is introduced to the side of the bottom opening portion 96b from a drainage ditch formed by the partition wall. Furthermore, since the inlet of the fan 97 is faced to the first opening portion 98a provided on the side face of the evaginated portion 95b apart from a drainage ditch, the rain water which got into the inside of the upper edge opening portion 96a never flows into the inlet inside of the fan 97. Therefore, it is possible to prevent a defect that the fan 97 touches the rain water so as to be rusted from occurring.

Also, as shown in FIG. 6, a plurality of printed circuit boards 4 (three printed circuit boards 4A, 4B and 4C are shown in FIG. 6) are disposed in the inside of the second chamber 73 of the exterior packaging case 7. Three printed circuit boards 4A, 4B and 4C are disposed as being layer-like with an appropriate distance one another and thermal insulation gaps 100B, 100C, 100D and 100E composed of air layers are set between adjacent printed circuit boards and between the printed circuit board and the partition wall 10 or the panel 13 on the substrate side.

For example, the first printed circuit board 4A is clamp-fixed to front edges of a plurality of supporting pieces 75 provided vertically on the partition wall 10 by mounting screws 99a and thus the thermal insulation gap 100B is set between it and the partition wall 10. The second printed circuit board 4B is clamp-fixed to a plurality of brackets 101 fixed on the inner face of the panel 13 on the substrate side by mounting screws 99b and thus the thermal insulation gap 100C is set between it and the first printed circuit board 4A.

Further, the third printed circuit board 4C is clamp-fixed to a supporting projection 13a provided on the panel 13 on the substrate side by a mounting screw 99c. In this manner, the thermal insulation gap 100D is set between the third printed circuit board 4C and the second printed circuit board 4B, and the thermal insulation gap 100E is set between the third printed circuit board 4C and the panel 13 on the substrate side.

A heat radiation rubber 104A composed of a heat conductive fabrication object having an excellent thermal conductivity is intervened between an electronic part 102 (for example, LSI, microprocessor or the like which generates heat terribly when operated) mounted on the first printed circuit board 4A and the duct member. Also, a heat-sink 105 having an excellent thermal conductivity is clamp-fixed on the upper face the evaginated portion 95b of the duct member 95 by a mounting screw 106a. A heat radiation rubber 104B is intervened between the heat-sink 105 and the first printed circuit board 4A, and a heat radiation rubber 104C is intervened between the heat-sink 105 and the second printed circuit board 4B.

It is possible to cite, for example, "cool-provide" made by Kitagawa Industries Co., LTD. for the heat radiation rubbers 104A, 104B and 104C. The cool-provide is composed of a mold body of silicone gel having a thermal conductivity and has an excellent flexibility, and it is possible to mold it in a large variety of shapes easily.

It is possible to cite a matter, for example, like next as a feature of the cool-provide. The color of the cool-provide is visually "green", the thermal conductivity thereof is 2 (W/m*K) according to a test procedure (QTM method), the specific gravity thereof is 1.92 and the hardness thereof (ASKERC) is 20 according to JISK6253 while it has flame resistance so as to have a measured value of V-1 according to a test procedure UL94. Further, the cool-provide has a tack property (being stuck-on a material body or a property of sticking a material body) and it is possible to fix a part or the like temporarily only by an adhesive force of the surface portion without using a firmly fixing means such as a screw if it is a material body or a part having a weight to a certain degree.

In a heat radiation rubber 104 having such a property, one face of the heat radiation rubber 104A is adhered to the surface of the duct member 95 and the other surface thereof is adhered to one face of the first printed circuit board 4A. The other surface of the first printed circuit board 4A is adhered with one face of the heat radiation rubber 104B and the other surface thereof is adhered with one face of the heat-sink 105. Then, the other surface of the heat-sink 105 is adhered with one face of the heat radiation rubber 104C and the other surface thereof is adhered with one face of the second printed circuit board 4B. It should be noted that a heat radiation rubber 104 is not used for the third printed circuit board 4C and the reason thereof is because no electronic part of significant heat generation is mounted on the third printed circuit board 4C.

According to such a constitution, when the first printed circuit board 4A generates heat caused by the operation of electronic parts or the like mounted thereon, heat is conducted to the duct member 95 from the electronic part 102 through the heat radiation rubber 104A on one hand and heat is conducted to the duct member 95 through the heat radiation rubber 104B and the heat-sink 105 on the other hand. Also, when the second printed circuit board 4B generates heat caused by the operation of electronic parts or the like, heat is conducted to the duct member 95 through the heat radiation rubber 104C and the heat-sink 105. As a result, heat of the first printed circuit board 4A and the second printed circuit board 4B can be conducted to the duct member 95 efficiently, because both of the heat radiation rubber 104 and the heat-sink 105 are formed by conductors transmitting heat well.

Further, not only the duct member 95 is formed by a heat conductor but also the fluid path 96 is formed inside thereof and the fan 97 is provided in the fluid path 96, so that it is possible to remove the heat of the duct member 95 and cool it by driving the fan 97 and circulating ambient air in the fluid path 96. Therefore, it is possible to radiate the heat of the first and second printed circuit boards 4A and 4B to the outside efficiently through the heat radiation rubber 104, the heat-sink 105 and duct member 95 and to prevent the temperature of the inside of the second chamber 73 from becoming high more than necessary.

Also, as shown in FIG. 5, the lens device 6 is contained in the inside of the second chamber 73 of the exterior packaging case 7 on a condition that the objective lens 16 is exposed to the outside of the exterior packaging case 7. The lens device 6 is provided with a lens body tube 110 in which a plurality of lenses including the objective lens 16 are contained and the CCD 5 is disposed on a light axis of the back face of the lens body tube 110. A reference numeral 111 shown in FIG. 5 is a heat-sink enclosing the upper face and one side face of the lens body tube 110. The heat-sink 111 is a device for acquiring a smooth operation of the lens device 6 or the CCD 5 by suppressing the heat generation of the lens device 6, the CCD 5 or the like.

The heat-sink 111 comprises an upper face portion 111a, a side face portion 111b and a back face portion 111c and is fixed to the lens body tube 110 by a firmly fixing means such as a mounting screw which is not shown. The outer face of the lens body tube 110 touches respective inner faces of the upper face portion 111a and the side face portion 111b of the heat-sink 111 and the CCD 5 is fixed to the front face of the back face portion 111c. It is possible to cite, for example, a zoom lens motor generating heat concurrently with its operation or an electronic part or the like such as the CCD 5 as a heat generation source of the lens device 6 or the like. It is suitable for the material of the heat-sink 111 to use, for example, a copper plate which is a heat conductor, but it is needless to say that other metals can be used and it is also possible to use engineering plastics if they are heat conductors.

According to the disc type image pickup device having such a constitution, a partition wall for partitioning the inside of the exterior packaging case 7 into two portions is provided and at the same time, an insulation plate which is a thermal insulation member is provided on one face (both faces are also possible) of the partition wall for covering approximately the whole thereof, so that it is possible to dispose the disc drive apparatus and the printed circuit board separately and isolated in the chambers by means of these partition wall and insulation plate. Consequently, it is possible to make it difficult for the heat generated by the operation of the electronic parts mounted on the printed circuit board to be transmitted to the side of the table rotation device.

In this manner, it is possible to prevent or suppress a phenomenon that the table rotation device is affected thermally by the heat generated on the side of the printed circuit board and to prevent or suppress a phenomenon that a malfunction occurs caused by a fact that the table rotation device becomes a high temperature more than necessary or the rotation efficiency is deteriorated. Also, the inside of the exterior packaging case 7 is closed by the partition wall or the like, so that for example, in case of assembling operation, it is possible to decrease the possibility that dust gets into the side of the disc drive apparatus. Also, it is possible to increase the effect further higher by making the thermal insulation member as a dual structure.

Further, in aforesaid embodiments, since the disc drive apparatus is supported so as to be suspended in the hollow in the housing by a damper structure composed of the insulator, it is necessary to ground-connect the mechanical chassis of the disc drive apparatus to the ground portion of the exterior packaging case, but it is possible to take the ground without bothering the damper structure, because a constitution such that a grounding member deformable in three directions of lengthwise, crosswise and in height is to connect both of them. Then, it is needless to say that for a countermeasure relating to a static charge of the table rotation device and there is an extreme effect not only for a countermeasure to the electrostatic but also for a countermeasure to undesired radiation. Furthermore, since the fixed portions of both the edges of the grounding member are fixed to the mechanical chassis and the partition wall by small-screw locking respectively, it is possible to take the ground certainly.

The present invention is not restricted to the exemplified embodiments mentioned above and also shown in the drawings and it is possible to apply various modified embodiments in an area without departing from the scope thereof. For example, it was explained in aforesaid embodiments about examples where the present invention is applied to a disc type image pickup device using a DVD as a recording medium, but it is applicable to use a disc shaped recording medium of other recording system such as a magneto-optical disc or a magnetic disc. Further, the present invention is applicable to various electronic equipment such as, for example, a still camera, a personal computer with a camera function and others other than the disc type image pickup device.

Also, according to aforesaid embodiments, it was explained about examples where the present invention was applied to an apparatus which can not only reproduce but also record as a disc recording and/or reproducing apparatus, but it is needless to say that it is possible to apply to a reproduction-only disc reproducing apparatus or a recording-only disc recording apparatus. Further, according to aforesaid embodiments, it was explained about examples where one face of the partition wall 10 is covered by the insulation plate 11, but it is possible to take a constitution of covering both faces of the partition wall 10 by the insulation plate 11 and in such a case, it is possible to improve the insulation efficiency by the insulation plate 11.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A disc recording and/or reproducing apparatus comprising:
   a table rotation device for rotationally driving a disc shaped recording medium detachably mounted thereon;
   a mechanical chassis which supports said table rotation device;
   an optical pickup device for carrying out a record and/or a reproduction of an information signal with respect to said disc shaped recording medium driven rotationally by said table rotation device;
   a number of printed circuit boards for drive-controlling said table rotation device and said pickup device; and a case having a partition wall for partitioning an inside of said case into two portions so as to form a first chamber and a second chamber;

a number of elastic insulators each fixed to said partition wall and arranged so as to support said mechanical chassis such that said mechanical chassis is elastically supported by the partition wall; and a grounding member which is electronically conductive and deformable in a lengthwise direction, a crosswise direction and a height direction, said grounding member being arranged to electrically connect said mechanical chassis and said partition wall to each other, wherein said table rotation device and said pickup device are disposed in the first chamber and are supported by one face of said partition wall and the number of printed circuit boards is disposed in the second chamber and one of the number of printed circuit boards is supported by another face of said partition wall, wherein at least a part of one of the faces of said partition wall is covered by a thermal insulation member.

2. The disc recording and/or reproducing apparatus according to claim 1, further comprising a display device which can display a picture image obtained by a solid-state imaging device and the picture image, supplied from said solid-state imaging device and the picture image read out from said disc shaped recording medium can be displayed simultaneously on said display device.

3. The disc recording and/or reproducing apparatus according to claim 1, in which each elastic insulator comprises:

an elastic body having a cylindrical shape;

an annular groove provided at a mid-portion of the elastic body along an axial direction thereof, said annular groove being continuous in a circumferential direction; and a number of supporting projections provided on each of a top surface of the elastic body and a bottom surface of the elastic body, said number of supporting projections on the top surface and the bottom surface being arranged in the axial direction for restricting displacement of the insulator along the axial direction.

4. The disc recording and/or reproducing apparatus according to claim 3, in which said mechanical chassis has a number of notch hole portions, and the respective annular groove of each said elastic insulator is arranged in a respective notch hole portion.

* * * * *